Sept. 29, 1925.
V. G. VAUGHAN
WATER HEATER SYSTEM
Filed Aug. 18, 1923
1,555,338
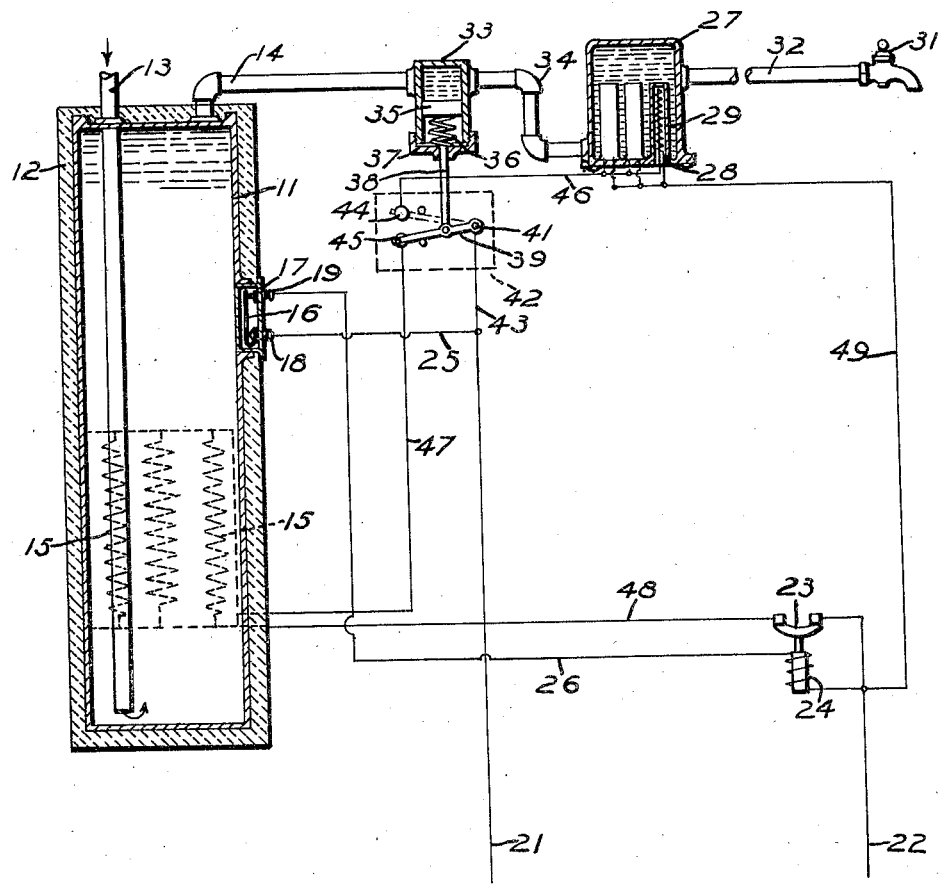
WITNESSES:
INVENTOR
Victor G. Vaughan.
BY
ATTORNEY Patented Sept. 29, 1925.

1,555,338

UNITED STATES PATENT OFFICE.

VICTOR G. VAUGHAN, OF WILKINSBURG, PENNSYLVANIA, ASSIGNOR TO WESTING-HOUSE ELECTRIC & MANUFACTURING COMPANY, A CORPORATION OF PENNSYLVANIA.

WATER-HEATER SYSTEM.

Application filed August 18, 1923. Serial No. 658,011.

*To all whom it may concern:*

Be it known that I, VICTOR G. VAUGHAN, a citizen of the United States, and a resident of Wilkinsburg, in the county of Allegheny and State of Pennsylvania, have invented a new and useful Improvement in Water-Heater Systems, of which the following is a specification.

My invention relates to electrically heated devices and particularly to electric water heating systems.

The object of my invention is to provide a relatively simple means and a system for electrically heating water for domestic use.

There are in general two systems of heating water. The first system employs a storage tank in which is stored the water that has been heated by any suitable means to the required relatively high temperature. A second system employs the so-called instantaneous heater in which the water is heated when and as used. The first system has several drawbacks, prominent among which is the one that the radiation losses from the outside of the storage tank are relatively large and, therefore, relatively large amounts of energy are required to maintain the water at the desired high temperature awaiting its use. It has been found by numerous experiments that the radiation losses from the surface of a storage tank containing water at 120° F. are only about one-half of those that would occur if the water were at a temperature of 160° F.

The second system has the drawback of requiring relatively large amounts of heat energy to raise the temperature of the water to the desired relatively high temperature as it is being drawn from the heating device.

My system combines the advantages of both of the present systems and embodies a main storage tank of relatively large capacity that is preferably, although not necessarily, electrically heated, but has a thermal means for controlling the energization of the heating element to limit the temperature of the water to a relatively low temperature, say 120° F. An instantaneous heater is connected to the storage tank by a conduit and is provided with an electric heating means for instantaneously heating the water to the desired higher temperature when and as it is drawn off from the main tank.

A pressure controlled means permits of selectively energizing the heating means in accordance with the conditions of operation of the system.

The single figure of the drawing illustrates schematically an apparatus connected to practice the method embodying my invention.

A main storage tank 11 may be of any suitable or desired construction, and for purposes of reducing the heat loss may be covered with a layer 12 of a suitable heat-insulating material usually employed in the art.

An inlet pipe 13 is provided for the tank 11 and an outlet pipe 14 is also provided, both of which are connected in the usual manner.

A plurality of electric heating elements 15 that are provided for the tank 11 may be located in any suitable or desired heating relation relatively to the tank 11. Their construction is not illustrated in detail, as they may be of any suitable or desired type, and they may be located either adjacent to the outer periphery of the tank 11 or with the tank itself, as may be considered desirable or necessary.

A thermal controlling means for the tank 11 may comprise a thermostatic member 16 that is located on a plate 17, of electric-insulating material, terminal members 18 and 19 being provided for the thermostatic strip 16.

A pair of conductors 21 and 22 are provided, which may be connected to any suitable source of electrical energy and an electromagnetic circuit breaker 23 controls the supply of energy to the heating units 15. The terminal members 18 and 19 of the thermal controlling means are connected respectively to the conductor 21 and to one of the ends of the coil 24 of the circuit breaker 23 by conductors 25 and 26. So long as the temperature of the water located within the tank 11 is below a predetermined value for which the terminal strip 16 is adjusted, the energizing circuit comprising the strip 16, the conductors 25 and 26 and the coil 24 is energized and the circuit interrupter 23 is maintained in its closed position.

If the temperature exceeds the predetermined value, the circuit is interrupted by the terminal strip 16, the coil 24 is de-energized and the circuit through the heating coils 15 is interrupted until, upon a dropping of the temperature of the water in the tank 11, the terminal means again closes the energizing and holding circuit through the coil 24.

An instantaneous heater is here illustrated as comprising a small auxiliary tank 27 having a plurality of heating elements 28 located within tubular members 29 in order that the heat generated in the heating elements 28 may be quickly absorbed by the water flowing through the tank 27. A faucet 31 is connected to the tank 27 by a conduit 32 to permit of withdrawing water therethrough and from the main tank 11, as desired. Any other desired construction, such as a coiled conduit having heating means associated therewith, may be employed.

A pressure actuated means for selectively controlling the energization of the heating units 15 and 28 comprises a cylinder 33 that is connected to one end of the conduit 14 and is also connected by a conduit 34 to the small tank 27. A piston 35 is located within the cylinder 33, a coil spring 36 being provided to move the piston 35 within the cylinder 33 when permitted by a reduction of the pressure of the water located within the cylinder 33 above the piston 35 upon the opening of the faucet 31. A cap member 37 is provided for the otherwise open end of the cylinder 33 and constitutes an abutment for one end of the spring 36.

The piston 35 has connected thereto a link 38 that is pivotally connected at its lower end to a rod member 39 intermediate its ends. The member 39 is pivotally mounted at 41 on a suitable base indicated by the broken lines 42, a conductor 43 connecting the member 39 to the supply circuit conductor 21. A pair of contact members 44 and 45 are provided on the plate 42, the contact terminal 44 being connected to one end of the resistor members 28 by a conductor 46. The contact terminal 45 is connected by a conductor 47 to one end of the resistor members 15, the other end of which is connected by a conductor 48 to one terminal of the circuit interrupter 23. The other end of the resistor 28 is connected to supply circuit conductor 22 by a conductor 49.

The system is illustrated in the position in which no water is being drawn off, in which case the pressure in the cylinder 33 against the upper surface of the piston 35 is sufficient to overcome the pressure of the spring 36, and cause the piston to be located in such position that the free end of the arm 39 operatively engages the contact member 45. If the temperature of the water in the tank 11 is below the predetermined value for which the thermostatic strip 16 has been set, the circuit interrupter 23 will be in its closed position and the heating elements 15 will be energized. As soon as the temperature of the water in the tank 11 and therefore of the thermostatic strip 16 reaches or exceeds the predetermined value, the circuit interrupter 23 is de-energized by reason of the thermostatic strip 16 disengaging the contact member 17, whereby the supply of energy to the heating elements 15 is interrupted.

If, under either of the above described conditions, the faucet 31 is opened to permit of withdrawing water from the tank 11, the pressure within the cylinder 33 is reduced sufficiently to permit the spring 36 moving in an upwardly direction and causing the arm 39 to disengage the member 45 and to operatively engage the terminal member 44. This interrupts the supply of energy to the heating elements 15 and energizes the heating elements 28 in the small auxiliary tank which are therefore immediately effective to heat the water as it flows through the auxiliary tank 27. By this method, I limit the amount of energy which is required for heating the water to a relatively high temperature, as the water is not heated from the ordinary temperature which may be around, say 60° F. The water has been heated while being stored in the tank 11 to an intermediate temperature, and it is only necessary for the instantaneous heating elements 28 to raise the temperature from say 120° F. to 160° F., which can be done much more easily than if it were necessary to heat the water from the lower temperature.

Various modifications and changes may be made herein without departing from the spirit and scope thereof, and I desire, therefore, that only such limitations shall be placed thereon as are imposed by the prior art or are set forth in the appended claims.

I claim as my invention:

1. In a water-heating system, the combination with means for storing a relatively large quantity of water, means for heating it to a predetermined temperature, means for maintaining it at substantially said predetermined temperature, and means for permitting of drawing off a part thereof, of means for instantaneously heating said part drawn off to a higher predetermined temperature.

2. In a water heating system, in combination, means for storing a relatively large quantity of water, means for heating it to, and for automatically maintaining it at, a predetermined temperature, means for drawing off a part of said stored water and means for heating the water thus drawn off a predetermined amount.

3. In a water heating system, in combination, means for storing a relatively large quantity of water, electric means for heating the water, thermally actuated means for controlling said electric heating means to maintain the water at a substantially constant temperature, means for drawing off said water as required, means for heating the water as it is drawn off, and means for causing the interruption of energization of the first heating means when said second heating means is energized.

4. In a water heating system, in combination, means for storing a relatively large quantity of water, electric means for heating the water, thermally actuated means for controlling said electric heating means to maintain the water at a substantially constant temperature, means for drawing off said water as required, means for heating the water as it is drawn off, and means, controlled by the water as it is being drawn off, for controlling the energization of said second heating means.

5. In a water heating system, in combination, means for heating, maintaining and storing a relatively large quantity of water at a predetermined temperature, electric means for instantaneously heating a part of said stored quantity of water to a higher temperature, and means for permitting only one of said heating means to be energized at one time.

6. In a water heating system, in combination, means for heating, maintaining and storing a relatively large quantity of water at a predetermined temperature, electric means for instantaneously heating a part of said water as it is being drawn from said storing means, and means for causing the de-energization of said first heating means upon the energization of said second heating means.

7. In a water heating system, in combination, means for heating, maintaining and storing a relatively large quantity of water at a predetermined temperature, electric means for instantaneously heating a part of said water as it is being drawn from said storing means, and pressure controlled means for causing the de-energization of said first heating means upon the energization of said second heating means.

8. In a water heating sytem, in combination, means for heating, maintaining and storing a relatively large quantity of water at a predetermined temperature, electric means for instantaneously heating a part of said water as it is being drawn from said storing means, and switching means controlled by the flowing water for causing the de-energizatin of the first heating means and then causing the energization of the second heating means.

9. In a water heating system, in combination, means for storing a relatively large quantity of water, electric means for heating it to and for automatically maintaining it at a predetermined temperature, electric means for heating said stored water as it is drawn off, and means for limiting the energy input into the system to that of only one of said heating means.

10. In a water heating system, in combination, means for storing a relatively large quantity of water, electric means for heating it to and for automatically maintaining it at a predetermined temperature, electric means for heating said stored water as it is drawn off, and pressure-controlled means for permitting only one of said electric heating means to be energized at one time.

11. In a water heating system, in combination, a main storage tank, electric heating means operatively associated with said tank, thermally-actuated means for controlling the energization of said tank, heating means to limit the temperature of the water therein to a predetermined value, means comprising an auxiliary tank for drawing off water as required for use, electric heating means associated with said auxiliary tank for instantaneously heating the water drawn off as it passes through said auxiliary tank, and pressure-actuated means controlled by the water drawn off to de-energize the main tank heating means and to energize the auxiliary tank heating means.

12. In an electric water heating system, in combination, means for storing and for electrically heating and maintaining a relatively large quantity of water at a predetermined temperature, electric means for instantaneously heating a part of said stored quantity of water when and as it is drawn off for use and means for selectively energizing said heating means in accordance with the conditions of operation of said system.

In testimony whereof, I have hereunto subscribed my name this 13th day of August 1923.

VICTOR G. VAUGHAN.